United States Patent

[11] 3,627,262

| [72] | Inventor | Dwight E. Hottle<br>2866 Lakeland Parkway, Cuyahoga Falls, Ohio 44224 |
|---|---|---|
| [21] | Appl. No. | 4,939 |
| [22] | Filed | Jan. 22, 1970 |
| [45] | Patented | Dec. 14, 1971 |

[54] VALVE HAVING AXIALLY SHIFTING CLOSURE MEANS
6 Claims, 6 Drawing Figs.

[52] U.S. Cl. .................................................. 251/346
[51] Int. Cl. ..................................................... F16k 31/44
[50] Field of Search .......................................... 251/152, 341, 343, 346

[56] References Cited
UNITED STATES PATENTS

| 506,846 | 10/1893 | Felthousen .................. | 251/346 |
| 1,193,011 | 8/1916 | Gibbs ......................... | 251/346 X |
| 1,549,304 | 8/1925 | Hackenberg ................. | 251/346 X |

Primary Examiner—William R. Cline
Attorney—Freeman & Taylor

ABSTRACT: An in-line type of valve made up of first and second connector elements that are telescoped within opposed ends of a generally cylindrical housing unit that, in turn, has a central baffle, with the connector elements having a fixed relationship with each other during relative rotational movement of the housing so that the internal baffle having axial fluid orifices can be shifted into and out of sealing relationship with one of said connector elements.

INVENTOR.
DWIGHT E. HOTTLE
BY Freeman & Taylor
ATTORNEYS

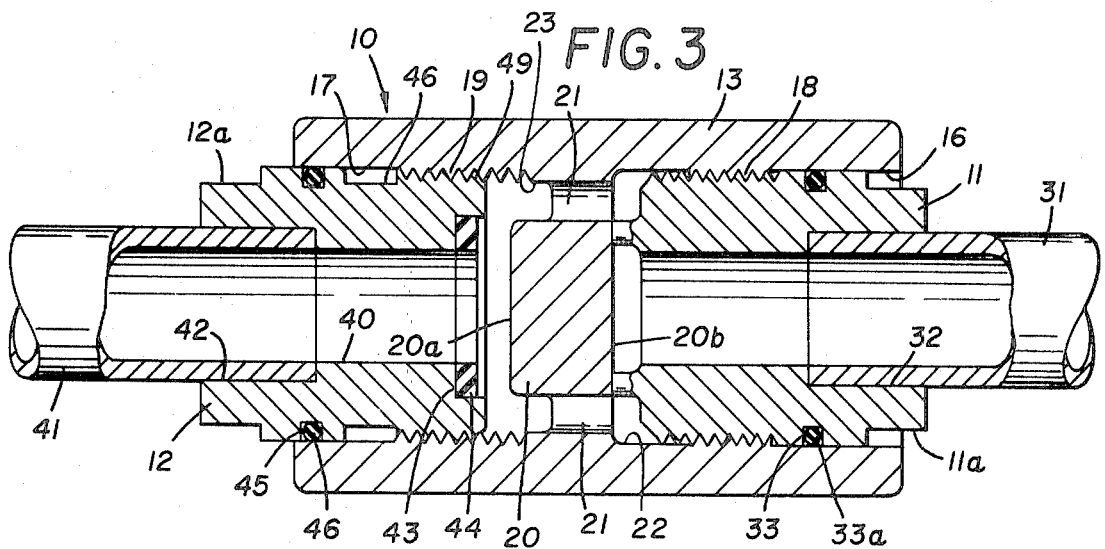
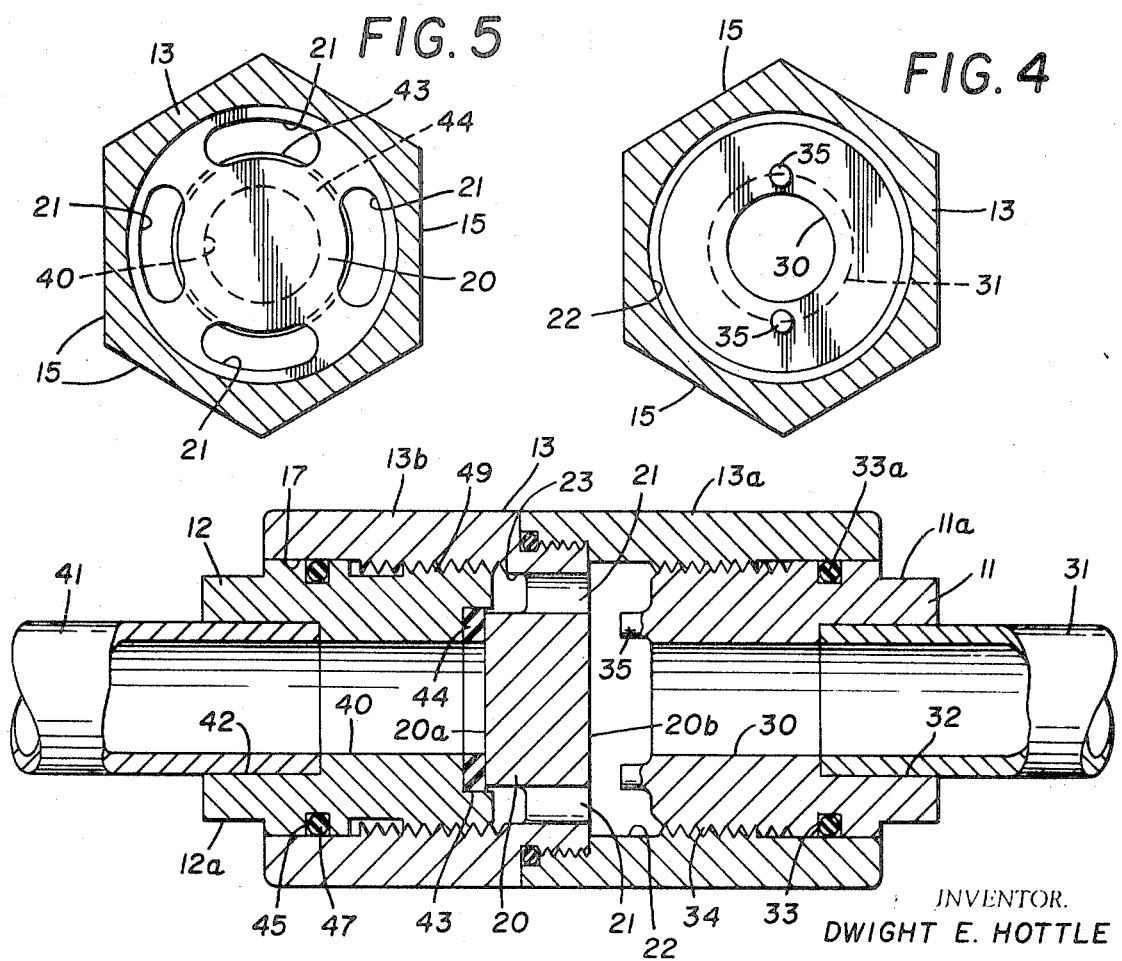

1

VALVE HAVING AXIALLY SHIFTING CLOSURE MEANS

BACKGROUND OF THE INVENTION

1. Field of the Invention

Valves have long been known as useful devices for controlling the flow of fluids through pipes or other means. Conventional valves generally include a plug or other type of closure unit for shifting into and out of closing relationship as regards fluid flow for operation by an external handlelike means.

2. Description of the Prior Art

While numerous types of valves have been established in the prior art over the years, applicant is not aware of any valve that approaches the simplicity and uniqueness of operation as the subject valve hereinafter described.

SUMMARY OF THE INVENTION

The improved valve hereinafter disclosed is believed unique in several respects as follows.

First, by employing a telescoping cylindrical housing of the type hereinafter described, and having the operation of the valve controlled by mere rotational movement of the same, a very compact valve mechanism is presented that materially enhances the number of applications for which this valve can be utilized. In this regard, in the conventional prior art, valves normally employed a handle or other protruding object so that in tight quarters installation of the valve is difficult and in some instances not possible at all.

Secondly, utilizing the simplified construction hereinafter described, applicant has produced a valve that will be extremely low cost in operation because of the fact that the essential components thereof can easily be machined, cast, or injection molded on a production basis, dependent upon the material employed.

Third, by minimizing the number of component parts employed, a more foolproof and maintenance-free type of valve is provided, with obvious advantages to the end users.

Production of an improved valve having the above described characteristics accordingly becomes the principal object of the invention, with other objects thereof becoming more apparent from a reading of the following brief specification, considered and interpreted in view of the accompanying drawings.

OF THE DRAWINGS

FIG. 3 is a view similar to FIG. 2 but showing the valve in open position.

Figure 2:
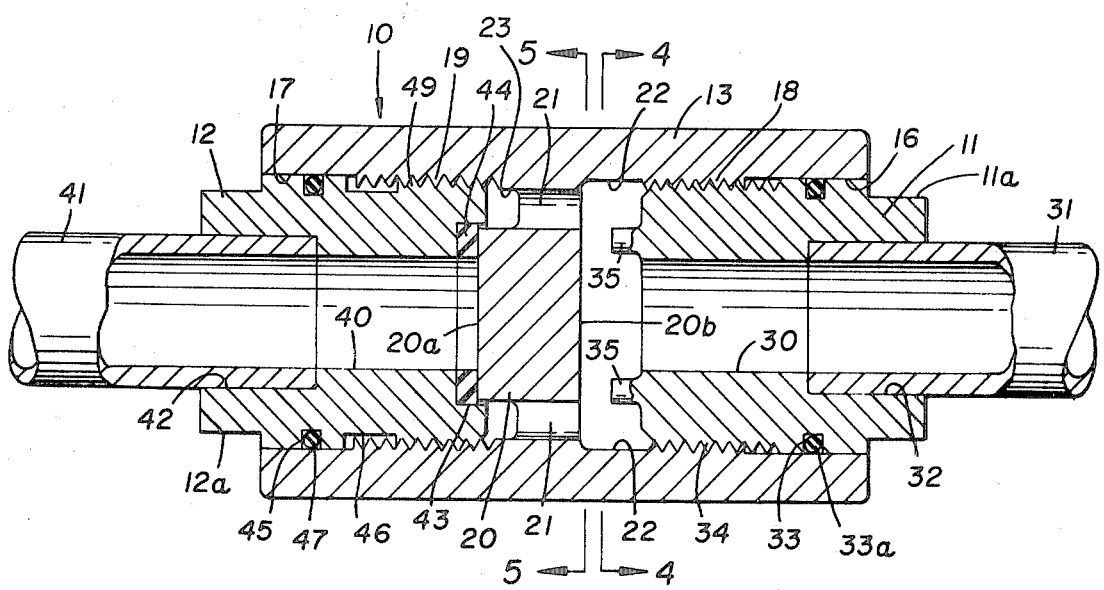
FIG. 2 is a sectional view taken on the lines 2—2 of FIG. 1 and showing the improved valve in closed position.

FIGS. 4—4 and 5—5 are sectional views taken on lines 4—4 and 5—5 respectively of FIG. 2.

FIG. 6 is a sectional view of a modified form of the invention.

Referring now to the drawings, and in particular to FIGS. 2 and 3, the improved valve, generally designated by the numeral 10, includes a first connector element 11, a second connector element 12 and an elongate housing 13 that is axially telescoped over the connector units 11 and 12 at its opposed axial ends, as clearly shown in FIGS. 2 and 3 of the drawings.

Figure 1:
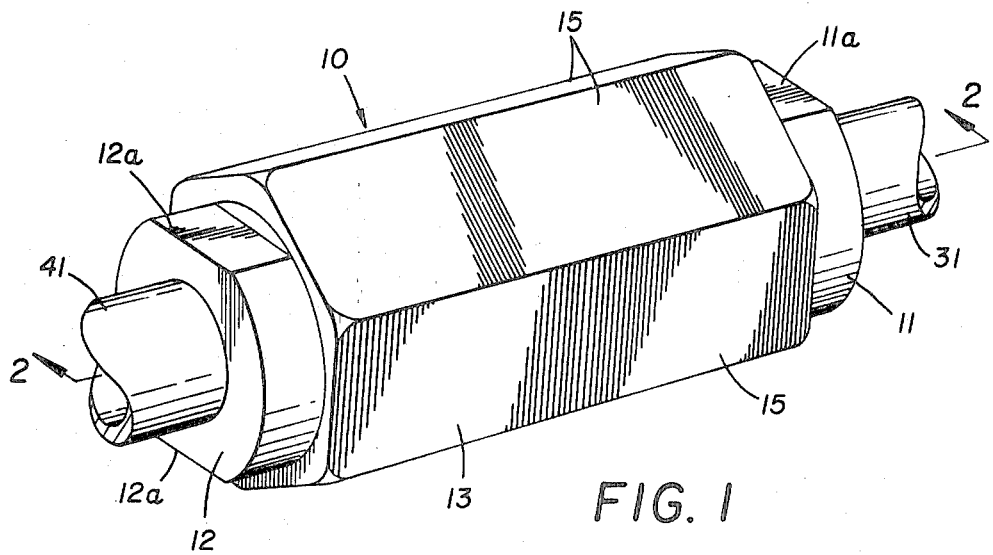
FIG. 1 is a perspective view of the improved valve.

With reference to the elongate housing 13, the same is generally tubular or cylindrical in shape, although and as shown in FIG. 1, the same may be provided with a series of flatted, external surfaces 15,15 for the purpose of increasing the ease with which rotation may be achieved, as by the use of a wrench or other turning mechanism.

In the preferred embodiment shown in FIGS. 1 through 5, the housing 13 has smooth, cylindrical internal surfaces, as indicated at 16 and 17, that are presented outboard with respect to the threaded surfaces 18 and 19 respectively. The central portion of the housing 13, between threaded surfaces 18 and 19, includes an integral baffle 20 that has a series of through fluid orifices 21,21 which permit axial fluid flow through the valve when the same is in the open position of FIG. 3, with fluid flow through the valve being reversible in direction as required by the particular application.

Additionally, the internal surface of the housing 13 includes cylindrical land surfaces 22 and 23, between threaded surfaced 18 and 19 and the baffle 20, that coact with the orifices 21,21 to form a fluid passage through the valve, as shown in FIG. 3.

Turning now to the construction of the first connector element 11, the same is generally circular in configuration and includes a through central passage 30 that communicates with the conduit 31 so as to permit fluid flow between connector 11 and conduit 31, as clearly shown in FIGS. 2 and 3. Conduit 31 will be connected to a suitable source of fluid supply (not shown).

In the form of the invention, illustrated in the FIGS. 1 through 5, the passage 30 terminates at its outboard end in counterbore 32, that receives the conduit 31 therein. In this regard, and in the use of plastic components for example, it is believed apparent that an epoxylike compound could be employed to effectuate a fluidtight joint between the members 11 and 31 to avoid leakage.

On the other hand, if metals were being employed, it would perhaps be desirable if this connection were soldered, and finally, it is contemplated that in certain instances, it would be preferable to effectuate a threaded connection between these components at their point of connection.

Externally, the connector 11 includes an annular groove 33 within which an O-ring 33a may be received, and threads 34,34, with the threads 34,34 being adapted to mate with the previously described threads 18 of housing 13 as shown in FIGS. 2 and 3.

At its inboard end, connector 11 is provided with one or more axial projections 35,35 that are designed to limit the extent of axial movement to the left by unit 11 by virtue of the contact of these members with the central portion of the baffle 20, with this condition of contact being shown in FIG. 3 of the drawings.

The remaining connector element 12 is of generally the same overall configuration as the just described unit 11, and accordingly includes a through internal passage 40 that is in coextensive alignment with the internal opening of a conduit 41, with the conduit 41 being received in counterbore 42 and with the conduit 41 being secured in place with respect to the connector 12 by any one of the conventional securing-type means previously described in connection with connector 11.

At its inboard end, the connector 12 is provided with a counterbore 43 within which a sealing ring 44 may be received, with contact between the sealing ring 44 and face 20a of baffle 20 closing off orifices 21,21 and establishing a closed condition of said valve, as shown in FIG. 2.

Externally, the connector 12 includes an annular groove 45 and a somewhat wider axially spaced groove 46, with the groove 45 receiving O-ring 47 for sealing purposes, while groove 46 permits a pocket to form within which certain portions of the threaded area 19 may be received when the valve is in the closed position of FIG. 2. Also, the exterior of connector 12 includes threads 49 which mate with threads 19 of housing 13 in known fashion.

Flats 11a and 12a are shown provided on the outboard ends of connectors 11 and 12 respectively to permit utilization of turning tools such as wrenches.

In operation, it will first be assumed that the valve has been assembled to the position shown in the drawings, and further, that the conduits 31 and 41 have been connected thereto as illustrated. It will then be assumed that the valve is in the closed position of FIG. 2, and at that time the sealing contact between the sealing ring 44 and the face 20a, prevents fluid flow between the conduit members 31 and 41 through orifices 21,21.

In the event it is desired to open the valve, it is merely necessary to rotate the housing 13 about its axis of rotation and relatively of the units 11 and 12, which retains axial alignment with each other during this rotation of the housing 13.

Because the threads 18 and 19, 34 and 49 are all identical in pitch in the preferred embodiment of the invention, this relative rotational movement will effectuate an axial shifting of the housing from the position of FIG. 2 to the position of FIG. 3, the extent of said shifting being limited by contact between the projecting arms 35,35 and the surface 20b of baffle 20. At this time, the valve unit is open to permit flow between the members 31 and 41.

The embodiment of the invention, shown in FIG. 6, is identical in all respects to the embodiment of the invention shown in FIGS. 1 through 5, with the exception of the fact that the housing 13 is split into subhousings 13a and 13b, with these units being threaded together and sealed in the manner shown in FIG. 6. By this arrangement it is believed apparent that easier installation and disconnecting for repair purposes is achieved.

While a full and complete description of the invention has been set forth in accordance with the dictates of the patent statutes, it is to be understood that the invention is not limited to the specific form herein shown. Thus, and while it has been indicated that the material could vary between plastic, rubber and metal, dependent upon the use requirements, it is also to be understood that the invention is not intended to be limited to use as an in-line valve.

In this regard, it is believed apparent that member 41 for example could taper to nozzlelike configuration so that the unit could be attached with such nozzle construction onto the end of a conduit 31 that was in the nature of a garden hose so as to cause a low cost sprinkling head.

Accordingly, modification of the invention may be resorted to without departing from the spirit hereof or the scope of the appended claims.

What is claimed is:

1. A valve for use with inlet and outlet means comprising;
A. a first tubular connector adapted to be secured to said inlet means;
B. a second tubular connector adapted to be secured to said outlet means;
C. said second connector having resilient sealing means on its inboard end;
D. an elongate hollow housing
 1. having a central baffle with at least one through fluid orifice and
 2. shiftably secured to said first and second connectors in telescoped relationship with said first and second connectors on opposite sides of said baffle and
 3. means for sealingly shifting said connectors axially and in unison relatively of said baffle
  a. whereby said baffle may be moved into and out of sealing relationship with said resilient sealing means of said connector; and
E. means for limiting the amount of movement of said housing.

2. The device of claim 1 further characterized by the fact that said housing includes two subhousings adapted to be releasably connected to each other.

3. The device of claim 1 further characterized by the presence of turning means on the exterior of said housing.

4. The device of claim 1 further characterized by the fact that said means for limiting the amount of movement of said housing includes axial projections on the inboard end of said first connector which contact said baffle and limit axial movement of said first connector within said housing.

5. The device of claim 1 further characterized by the fact that the inboard end of said second connector has a counterbore and shoulder that contact said baffle and close off said orifices upon axial movement of said second connector within said housing with said resilient sealing means being carried on said shoulder.

6. The device of claim 1 further characterized by the fact that said first and second connectors have external threaded areas and said housing has mating internal threaded areas.

* * * * *